J. J. HENDRICKS & J. F. WELLS.
SLIMER.
APPLICATION FILED JUNE 29, 1915.

1,179,101.

Patented Apr. 11, 1916.
5 SHEETS—SHEET 1.

WITNESSES:
O. Johnson
Frank Warren

INVENTORS
John J. Hendricks
John F. Wells
BY
C. D. Haskins
ATTORNEY

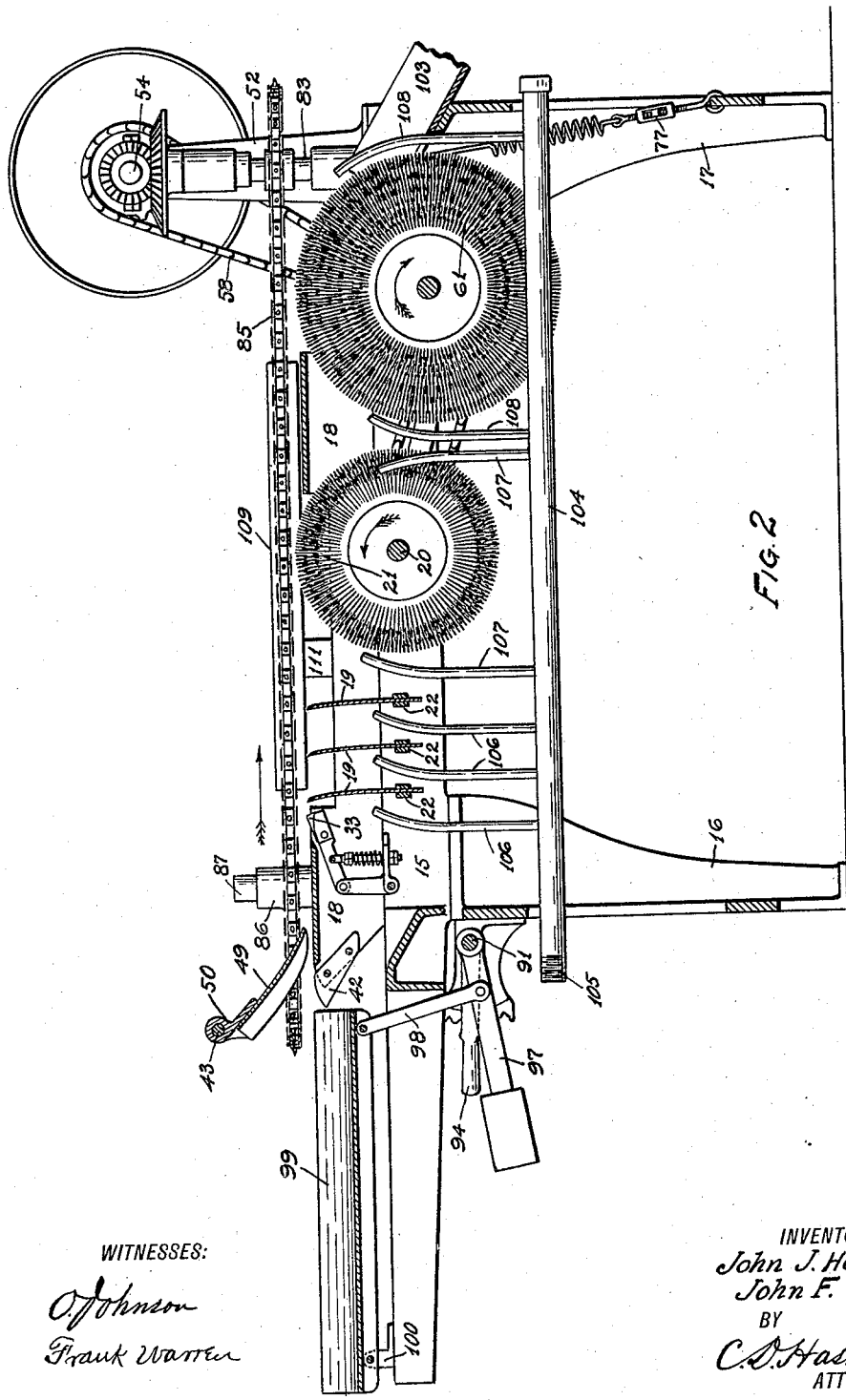

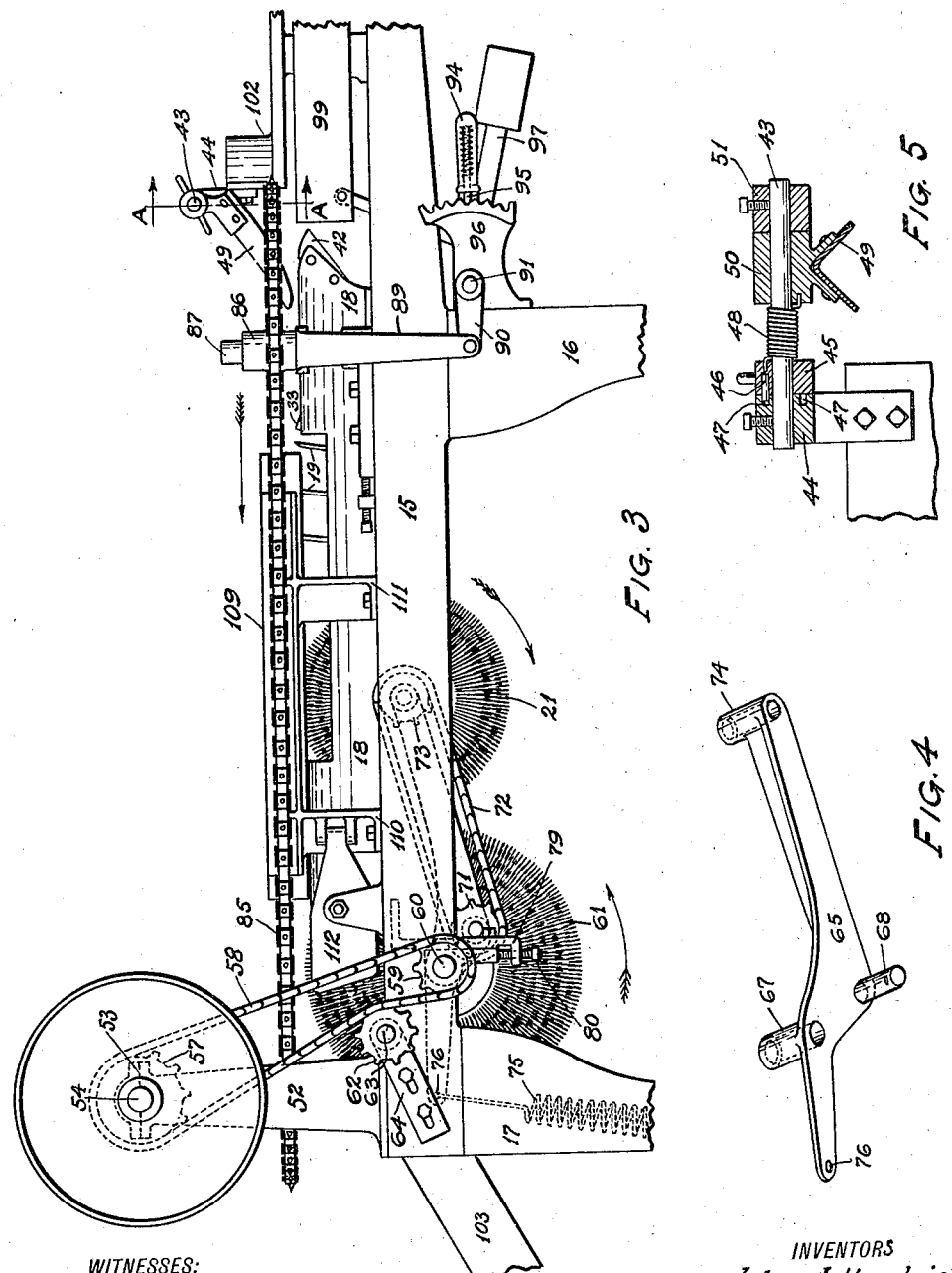

J. J. HENDRICKS & J. F. WELLS.
SLIMER.
APPLICATION FILED JUNE 29, 1915.

1,179,101.

Patented Apr. 11, 1916.
5 SHEETS—SHEET 4.

WITNESSES:
O. Johnson
Frank Warren

INVENTORS
John J. Hendricks
John F. Wells
BY
C. D. Haskins
ATTORNEY

J. J. HENDRICKS & J. F. WELLS.
SLIMER.
APPLICATION FILED JUNE 29, 1915.

1,179,101.

Patented Apr. 11, 1916.
5 SHEETS—SHEET 5.

WITNESSES:
O. Johnson
Frank Warren

INVENTORS
John J. Hendricks
John F. Wells
BY
C. D. Haskins
ATTORNEY

UNITED STATES PATENT OFFICE.

JOHN J. HENDRICKS AND JOHN F. WELLS, OF SEATTLE, WASHINGTON.

SLIMER.

1,179,101.      Specification of Letters Patent.      Patented Apr. 11, 1916.

Application filed June 29, 1915. Serial No. 36,943.

*To all whom it may concern:*

Be it known that we, JOHN J. HENDRICKS and JOHN F. WELLS, both citizens of the United States, residing at Seattle, in the county of King and State of Washington, have invented a certain new and useful Improvement in Slimers, of which the following is a specification.

Our invention relates to improvements in slimers which are employed in fish canneries in the operation of cleaning fish, and the object of my improvement is to provide a slimer which shall be adapted to be operated by power driven mechanism and which shall embody means for conveying through it one fish after another to subject such fish successively to the action of different operative parts which shall serve to clean such fish, thus to save manual labor in the work of preparing such fish for the operation of canning them. We attain such object by devices illustrated in the accompanying drawings wherein—

Figure 1:
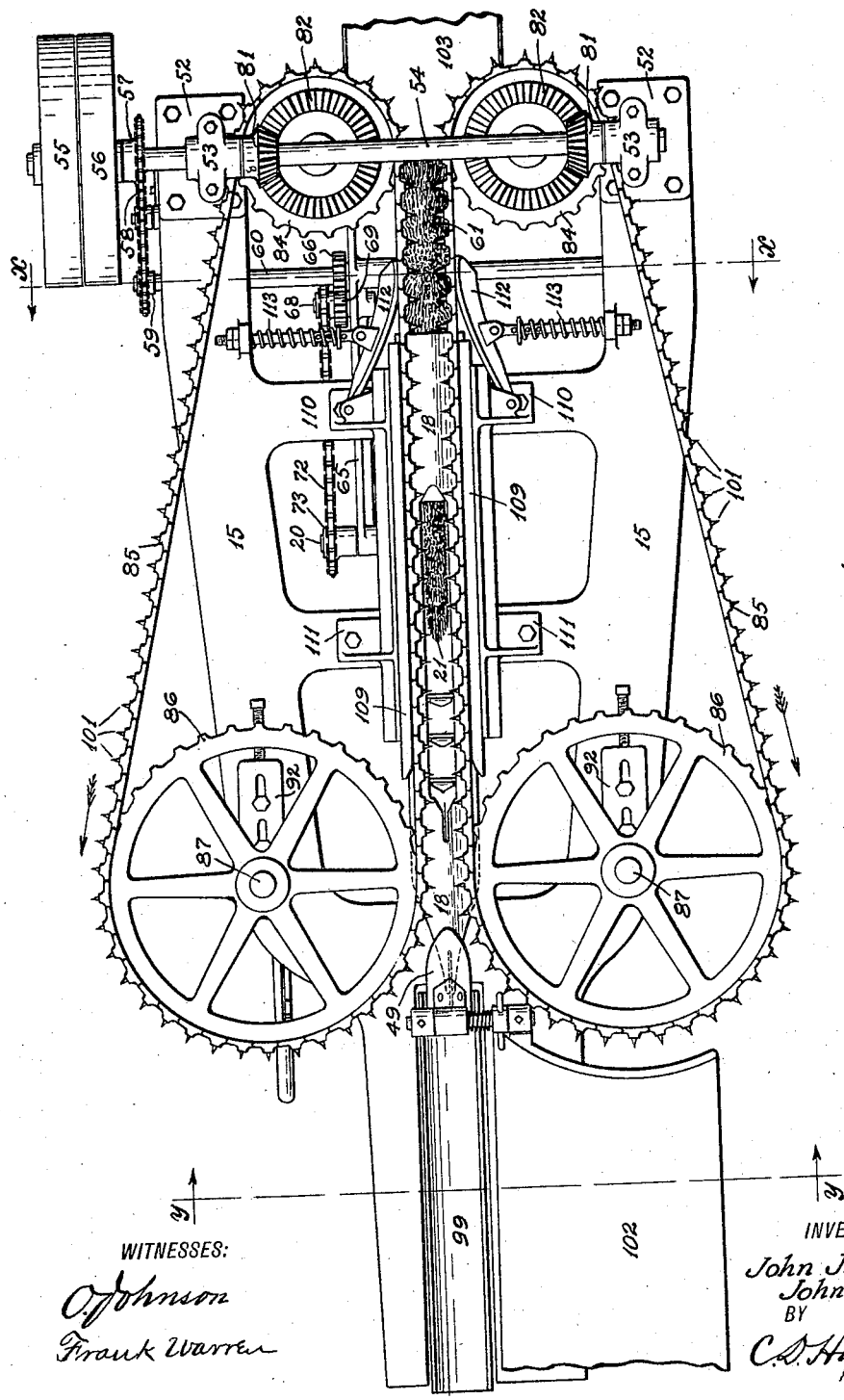
Figure 6:
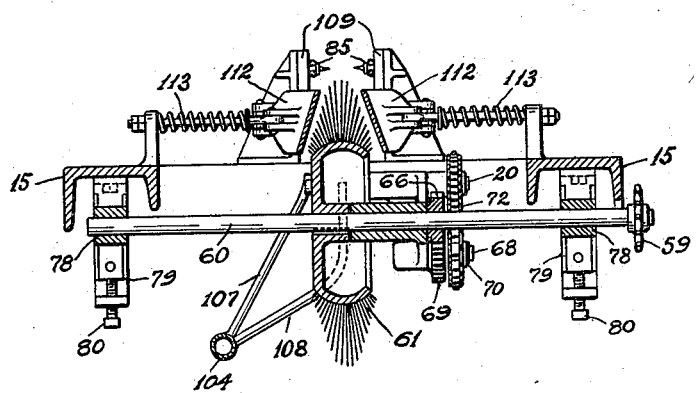
Figure 7:
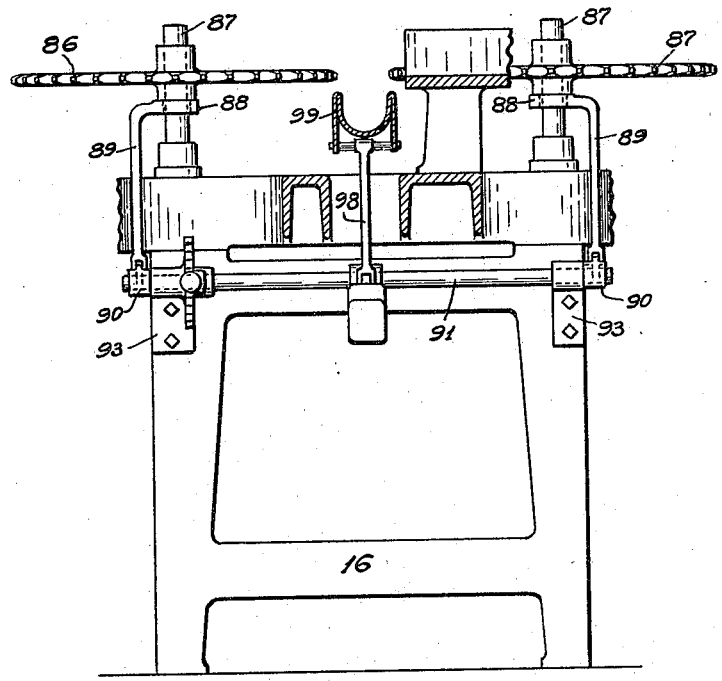
Figure 8:
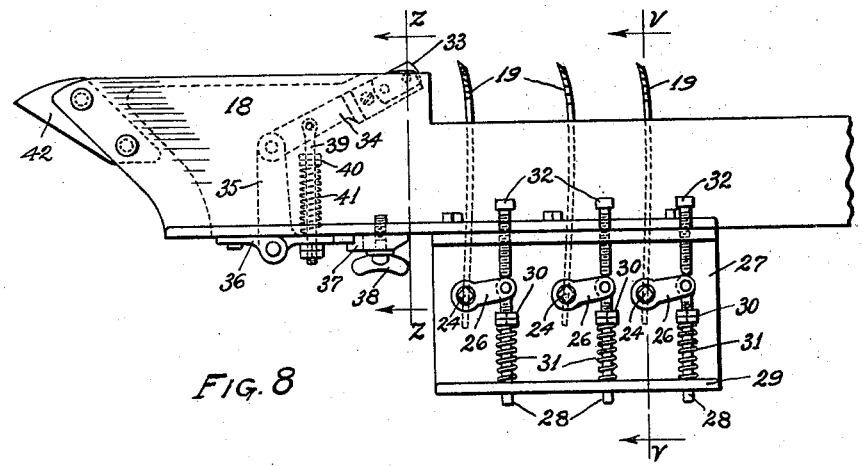
Figure 9:
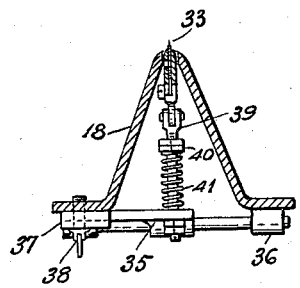
Figure 10:
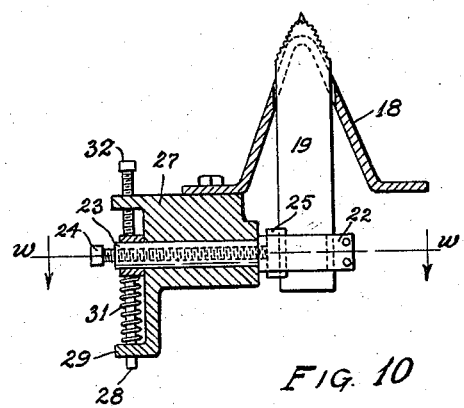
Figure 11:
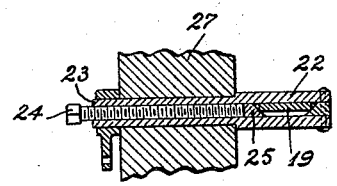

Figure 1 is a plan view of a slimer embodying my invention; Fig. 2 is a view of the same in vertical and longitudinal midsection; Fig. 3 is a fragmentary view of the same in side elevation; Fig. 4 is an enlarged perspective view of a detail of the same; Fig. 5 is an enlarged view in cross-section on broken line A, A of Fig. 3, showing certain related details of the same; Fig. 6 is a view of parts of the same in vertical cross-section on broken line $x$, $x$ of Fig. 1; Fig. 7 is a view of parts of the same in vertical cross-section on broken line $y$, $y$, of Fig. 1; Fig. 8 is an enlarged view in side elevation of parts of the same; Fig. 9 is a view of the same in vertical cross-section on broken line $z$, $z$ of Fig. 8; Fig. 10 is an enlarged view in vertical cross-section on broken line $v$, $v$ of Fig. 8; and Fig. 11 is an enlarged view in horizontal section on broken line $w$, $w$ of Fig. 10.

Referring to the drawings, throughout which like reference numerals indicate like parts, a cast iron frame 15 is secured in a horizontal position on supporting legs 16 and 17 and securely disposed on the top surface of said frame 15, to extend throughout a portion of the length thereof and equi-distant from its side edges, is a fish-guiding-support 18, preferably made of sheet metal whose form in cross-section somewhat resembles an inverted letter V, upon which fish-guiding-support 18 may be placed one fish after another to be guided and supported thereby as they are moved by suitable mechanism from one of its ends to the other, such fish having their heads cut off, their bellies cut open lengthwise and their intestines removed to adapt them to be placed astride of said fish-guiding-support 18 with their backs uppermost whereby during such movement they may be cleaned by associated devices hereinafter described. In the central portion of its length said fish-guiding-support 18 is provided with an oblong opening through the wall of its upper part through which opening projects upwardly the peripheral portion of a circular brush 21 and a plurality of scrapers 19, said circular brush 21 being fastened on a transversely disposed shaft 20 which is rotatably mounted in a sleeve bearing integrally attached to the end of a lever 65, while the scrapers 19 are each detachably clamped to a holder 22 which is integrally associated with a shaft 23 which is mounted in bearings formed in a bracket 27 that is attached to a flange on the fish-guiding-support 18, as more clearly shown in Figs. 10 and 11.

Each of the shafts 23 is provided with a concentrically disposed screw-threaded hole which extends from one of its ends into the holder 22 and within such screw-threaded hole is disposed a square headed binding screw 24 that is adapted to engage with a movable clamping jaw 25 in the holder 22, whereby said clamping jaw 25 may engage with the edge portion of a scraper 19 thus to adapt such scraper 19 to be adjustably secured in any desired position and to be detachable from said holder 22. The outwardly projecting end portion of each of said shafts 23 is provided with a rearwardly projecting arm 26 to the end of which is articulated a rod 28 which projects downwardly through a flange 29 of the bracket 27, as more clearly shown in Fig. 8, and such rod 28 is provided with a screw-threaded portion adjacent to the arm 26 and with adjusting nuts 30 disposed on said screw-threaded portion which nuts 30 may be turned to adjust the effective force of a helical compression spring 31 which is disposed to surround the rod 28 between said nut 30 and said flange 29, whereby said compression spring 31 may exert its force to maintain the arm 26 in engagement with an adjustable limit screw 32 thus, in an obvious manner, adapting the scraper 19 to be yieldingly maintained in a desired vertical position for engagement with the inner sides of a fish as it passes over the fish-guiding-support 18.

Extending through the apex of the wall of the fish-guiding-support 18, adjacent to the forwardmost one of the scrapers 19, is a narrow slot through which projects a knife blade 33 which is detachably secured to one end of a lever-arm 34 whose other end is articulated with the top portion of an angular bracket 35 which is pivotally mounted to a bracket 36 which is fastened to a flange on the bottom part of the fish-guiding-support 18, as shown in Figs. 8 and 9, which bracket 35 is maintained normally in a fixed position by a clamp 37 which is releasably secured by a thumb-screw 38 which screws into the flanged bottom portion of one of the side walls of the fish-guiding-support 18, whereby said bracket 35 is adapted to be forced to swing downwardly to let the lever-arm 34 swing to a point below the bottom of the fish-guiding-support 18 in order to remove the knife blade 33 when it is desired to sharpen such knife blade 33 or replace it with a new one.

Articulated with the lever-arm 34 is a screw-threaded rod 39 which is provided with adjusting nuts 40 which are adapted to adjust the effective force of a helical compression spring 41 which surrounds said rod 39, to extend between said nuts 40 and the top surface of the horizontal portion of the bracket 35, whereby the knife blade 33, as shown in Fig. 8, is yieldingly maintained in a position above the apex of the fish-guiding-support 18 where it may cut into that portion of a fish adjacent to its back bone as such fish moves over the fish-guiding-support 18 in a direction toward the scrapers 19.

The front end portion of the fish-guiding-support 18 is tapered by pressing toward each other the end portions of its side walls and between such end portions is removably fastened a knife blade 42, as shown in Figs. 1 and 8, which is disposed to adapt it to cut and extend the length of the slit which is already cut in the belly of a disemboweled fish that may be caused to move over the fish-guiding-support 18.

Above the plane of the top of the fish-guiding-support 18 near the knife blade 42 is a fixed shaft 43 secured to a bracket 44 that is disposed in a fixed relation with respect to the frame 15 and on said shaft 43 adjacent to said bracket 44 is an adjusting collar 45 which is adapted to be maintained normally in a fixed circumferential position on the shaft 43 by a dowel pin 46 (as more clearly shown in Fig. 5) which may enter one of a plurality of holes 47 drilled in the adjacent side of the bracket 44, but which collar 45 may be moved away from the side of the bracket 44 to withdraw the pin 46 from engagement with its hole 47 whereupon the said collar 45 may be rotated to wind or unwind a helical spring 48 with one end of which it is connected and then be moved back again in engagement with the adjacent side of the bracket 44 to be again fixed in a desired circumferential position by the dowel pin 46 and one of the holes 47, thus to adjust the effective torsional force of said helical spring 48 in its function of swinging downwardly a pressure-bearing member 49 which is riveted to a hub 50 that is rotatably mounted on the shaft 43 adjacent to the outer end of the helical spring 48 with which it is connected.

A collar 51 is fixed on the shaft 43 adjacent to the hub 50 to maintain such hub 50 in its normal position on said shaft 43.

The pressure-bearing member 49 is formed somewhat like a shoe-horn, as indicated in Fig. 1, and thus mounted is adapted yieldingly to engage with the back of a fish that may be moved between it and the top surface of the fish-guiding-support 18.

Secured to the top surface of the frame 15 at the delivery end portion of the structure are upwardly extended brackets 52 provided with shaft bearings 53 within which is rotatably mounted a transversely disposed shaft 54 upon the outwardly projecting end portion of which is mounted a loose pulley 55 and a fixed driving pulley 56 and between the fixed driving pulley 56 and the adjacent bearings 53 is mounted a sprocket wheel 57 upon which is disposed a sprocket chain 58 which extends obliquely downward to a sprocket wheel 59 which is fixed on the outwardly projecting end of a shaft 60 upon which is mounted a circular brush 61 which is disposed normally to rotate in a plane registering with the fish-guiding-support 18 so that its bristles may project above the plane of the apex of the adjacent delivery end of said fish-guiding-support 18, as more clearly shown in Fig. 2.

In order to take up the slack of the sprocket chain 58 an idler sprocket wheel 62 is mounted on a stud 63 fixed on a slidably adjustable bracket 64 that is attached to the side of the frame 15, as more clearly indicated in Fig. 3.

On the shaft 60 is fastened a gearwheel 66, as shown in Fig. 1, and on such shaft 60, adjacent to the inner side of said gearwheel 66, is fulcrumed by its sleeved bearing 67 the lever 65 and on the the outer side of said lever 65 is a stud 68 upon which is rotatably mounted a gearwheel 69, which meshes with said gearwheel 66, and said gearwheel 69 is provided with a projecting hub 70 upon which is mounted a sprocket wheel 71, more clearly shown in Fig. 3, and upon such sprocket wheel 71 is disposed a sprocket chain 72 which extends to and engages with a sprocket wheel 73 which is fastened to the outwardly projecting end of the shaft 20 upon which the circular brush 21 is mounted, said shaft 20 being rotatably mounted and carried by a bearing 74 integrally fixed on the end of the lever 65. Thus rotary motion may be communicated to the brush 21 in response to the rotation of the shaft 54 by means of the sprocket wheel 57, the sprocket chain 58, the sprocket wheel 59, the shaft 60 (which at the same time will rotate the circular brush 61) the gearwheel 66, the gearwheel 69, the sprocket wheel 71 (on the hub of the gearwheel 69) the sprocket chain 72 and the sprocket wheel 73.

The lever 65 is adapted to be swingingly moved to raise the brush 21 to cause it to make a yielding engagement with the inside of a fish as such fish passes over the fish-guiding-support 18, such yielding engagement being effected by the action of an adjustable helical spring 75 which is connected with a hole 76 in the rearward end of the lever 65 to extend therefrom to connect with a turn-buckle 77 which is secured to the lower part of the leg 17, as more clearly shown in Fig. 2.

The shaft 60, as more clearly shown in Fig. 6, is disposed to revolve in vertically adjustable bearings 78 which are slidably disposed in brackets 79 secured to the under side of the frame 15, which bearings 78 may be raised and lowered by turning the adjusting screws 80.

When the vertical position of the shaft 60 is changed the sprocket wheel 62 will be adjusted by moving the bracket 64 to compensate for changes in the degree of slackness of the sprocket chain 58.

Upon the transverse shaft 54, as shown more clearly in Fig. 1, is fastened two beveled pinions 81, each of which meshes with a different one of beveled gearwheels 82 that are mounted on vertically disposed shafts, like shaft 83 shown in Fig. 2, and upon each of said vertical shafts 83 is fastened a sprocket wheel, as sprocket wheels 84, which sprocket wheels 84 revolve in a plane registering with the path of the sides of a fish disposed astride the fish-guiding-support 18, and upon each of said sprocket wheels 84 is disposed a sprocket chain 85, each of which sprocket chains 85 extends to and engages with a sprocket wheel, like sprocket wheels 86, which sprocket wheels 86 are rotatably mounted each on a vertically disposed shaft, like shafts 87, which shafts 87 are provided with bracket supports 92 which are mounted on the top of the frame 15 to be adjustable lengthwise thereof by means of adjusting screws, as shown more clearly in Fig. 1, whereby the sprocket chains 85 may be tightened or slackened.

The sprocket wheels 86 are adapted to be adjustably moved to a desired vertical position on the shafts 87 each by means of a collar 88 which is integrally connected with an arm 89 whose lower end is articulated with a crank-arm 90 that is fixed on a transverse shaft 91 which is mounted in bearing brackets 93 on the upper part of the legs 16, as more clearly shown in Fig. 7.

The shaft 91 may be rotatably moved to raise or lower the sprocket wheels 86 by means of a lever 94 which is secured to said shaft 91 and which is provided with a spring actuated detent 95 that is adapted to engage in a desired one of a number of notches formed in the circular edge portion of a bracket 96 which is secured to the side of the legs 16, as shown more clearly in Fig. 3.

Secured to the shaft 91 in the central portion of its length is a weighted arm 97 to which is articulated one end of a connecting rod 98 which projects upwardly and whose upper end is articulated with the end of a feeding trough 99 whose other end is hinged to a bracket 100 fixed on the outer end of an extended portion of the frame 15, as shown in Fig. 2, said feeding trough 99 being disposed to adapt it to guide fish on to the receiving end of the fish-guiding-support 18, thus if the shaft 91 be moved by the handle 94 to raise the sprocket wheels 86 the end of the trough 99 will be lowered, but if the handle 94 be moved to lower said sprocket wheels 86 then the end of the trough 99 will be raised. The purpose of raising the sprocket wheels 86 at the same time that the end of the trough 99 is lowered is to adjust the machine to operate on larger fish.

The relative positions of the sprocket wheels 86 and the sprocket wheels 84 are such as will cause the inner portion of each of the sprocket chains 85 to travel in a path adjacent to and parallel with a different one of the opposite sides of the fish-guiding-support 18 so that a fish may be engaged by pointed devices 101 fixed on the several links of said sprocket chains 85, whereby such fish may be carried from the receiving end of the structure to the delivery end thereof while astride said fish-guiding-support 18.

As shown in Fig. 1, there is provided an inclined apron 102 disposed adjacent to one side of the trough 99 from which apron 102 fish may slide into said trough 99.

At the delivery end of the structure adjacent to the periphery of the circular brush 61 is a chute 103 disposed to extend obliquely downward, into which chute 103 fish may be delivered as they pass from the end of the fish-guiding-support 18 over the upper portion of the periphery of said circular brush 61, as more clearly shown in Fig. 2.

In order that an ample supply of water may be delivered to the scrapers 19 and the brushes 21 and 61 for the purpose of keeping such parts clean and for washing the inside surfaces of the fish we have provided a water pipe 104 whose screw-threaded end 105 may be connected with a valve controlled water conduit, not shown, that may lead to a source of water supply, and connected with said water pipe 104 at different points are pipes 105, which extend to points adjacent to the scrapers 19, and pipes 107 which are disposed to supply water to the circular brush 21 and pipes 108 which are disposed to deliver water to circular brush 61.

In order to keep the inner portions of the sprocket chains 85 in engagement with the fish as they are moved by such sprocket chains 85 throughout the length of the fish-guiding-support 18, we have provided sprocket chain guides 109 disposed near each side of the fish-guiding-support 18 to engage with the back surfaces of the adjacent sprocket chains 85, said chain guides 109 being supported by brackets 110 and 111.

Pivotally mounted on the brackets 110, as more clearly shown in Fig. 1, are two arms 112 which are adapted to swing in horizontal planes yieldingly to engage with opposite sides of a fish while such fish is passing over the circular brush 61, such pivoted arms 112 being pressed toward the brush by helical compression springs 113, as indicated in Fig. 1, and such arms 112 having their planes disposed so that their top edges are nearer together than their bottom edges thus better to prevent fish from being thrown upwardly by the action of the circular brush 61.

The operation of our slimer when thus constructed is as follows: Rotary motion is communicated to the pulley 56 whereupon the brushes 21 and 61 will be rotated in the direction indicated by the arrows in Figs. 2 and 3, while the sprocket chains 85 will travel in the directions also indicated by the arrows in Figs. 1 and 2, and thereupon water under pressure is admitted into the pipe 104 to deliver such water to the scrapers 19 and to the circular brushes 21 and 61, then fish are successively disposed in the trough 99 with their backs up and moved on to the fish-guiding-support 18 to be engaged by the sprocket chains 85 thus to move such fish throughout the length of the fish-guiding-support 18, the pressure-bearing member 49 serving to press a fish downwardly on to the top of said fish-guiding-support 18 while the sprocket chains 85 are making their initial engagement with the sides of said fish and while the knife blade 42 is cutting a longer slit along the bottom of the disembowled fish, and when such fish, in its travel, reaches the knife blade 33 such knife blade will cut a slit in that portion of the fish adjacent to its back bone, then as such fish proceeds in its course the scrapers 19 will engage with the insides of the fish to scrape off objectionable matter, then passes over the circular brush 21 which makes a yielding engagement with the inside surface of the fish, thence the fish is carried to and over the brush 61 into the chute 103 at the delivery end of the structure. If large fish are being operated upon, the handle 94 is moved downwardly to raise the sprocket wheels 86 and to lower the end of the trough 99 to required vertical points, but if smaller fish are to be operated upon the sprocket wheels 86 are lowered and the end of the trough 99 raised to required suitable points.

Manifestly changes may be made in the forms, dimensions and arrangement of parts of my invention without departing from the spirit thereof.

What we claim is:

1. A slimer of the class described which embodies a horizontally disposed and suitably supported fish-guiding-support which is formed so that its cross-section shall resemble an inverted letter V; two sprocket chains provided with pointed devices fixed on links thereof, one portion of each of which sprocket chains is disposed parallel with and adjacent to a different one of the opposite side walls of said fish-guiding-support to adapt it to engage said pointed devices with one of the opposite sides of a disemboweled fish disposed astride of said fish-guiding-support; and adjustable means for raising and lowering those portions of said sprocket chains that are adjacent to the receiving end of said fish-guiding-support.

2. A slimer of the class described which embodies a horizontally disposed and suitably supported fish-guiding-support which is formed so that its cross-section shall resemble an inverted letter V; two sprocket chains provided with pointed devices fixed on links thereof, one portion of each of which sprocket chains is disposed parallel with and adjacent to a different one of the opposite side walls of said fish-guiding-support to adapt it to engage said pointed devices with one of the opposite sides of a disemboweled fish disposed astride of said fish-guiding-support; adjustable means for raising and lowering those portions of said sprocket chains that are adjacent to the receiving end of said fish-guiding-support; a feeding trough disposed with one of its ends adjacent to the receiving end of said fish-guiding-support; and adjustable means for raising and lowering said one end of said feeding trough.

3. A slimer of the class described which embodies a horizontally disposed and suitably supported fish-guiding-support which is formed so that its cross-section shall resemble an inverted letter V and which is provided with a slotted opening through the wall of its apex portion; a cutting-blade disposed normally to project upwardly through said slotted opening and adapted to make a yielding engagement with a disemboweled fish as it is moved astride of said fish-guiding-support over said cutting-blade; a pivotally mounted pressure bearing member disposed to extend over the top of the receiving end of said fish-guiding-support and adapted to press downwardly upon the back of a disemboweled fish as such fish is moved on to said receiving end portion of said fish-guiding-support; and vertically adjustable means for moving a disemboweled fish on said fish-guiding-support throughout its length.

In witness whereof, we hereunto subscribe our names this fifteenth day of June, A.D., 1915.

JOHN J. HENDRICKS.
JOHN F. WELLS.

Witnesses:
O. JOHNSON,
FRANK WARREN.

Copies of this patent may be obtained for five cents each, by addressing the "Commissioner of Patents, Washington, D. C."